(12) United States Patent
Hahn et al.

(10) Patent No.: US 9,888,417 B2
(45) Date of Patent: Feb. 6, 2018

(54) METHOD AND APPARATUS FOR SWITCHING CONNECTION IN WIRELESS COMMUNICATION SYSTEM

(71) Applicant: LG ELECTRONICS INC., Seoul (KR)

(72) Inventors: Gene Beck Hahn, Seoul (KR); Jae Hoon Chung, Seoul (KR); Hye Young Choi, Seoul (KR); Eun Jong Lee, Seoul (KR); Hee Jeong Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 260 days.

(21) Appl. No.: 14/156,150

(22) Filed: Jan. 15, 2014

(65) Prior Publication Data

US 2014/0198768 A1   Jul. 17, 2014

Related U.S. Application Data

(60) Provisional application No. 61/752,982, filed on Jan. 16, 2013, provisional application No. 61/753,951, filed on Jan. 18, 2013.

(51) Int. Cl.
*H04W 36/16* (2009.01)
*H04W 36/00* (2009.01)

(52) U.S. Cl.
CPC ..... *H04W 36/165* (2013.01); *H04W 36/0061* (2013.01)

(58) Field of Classification Search
CPC .................. H04W 36/165; H04W 36/0061
See application file for complete search history.

(56) References Cited

U.S. PATENT DOCUMENTS

| | | | |
|---|---|---|---|
| 2006/0148451 A1* | 7/2006 | Narasimha | 455/411 |
| 2012/0270553 A1* | 10/2012 | Ha | 455/438 |
| 2014/0011543 A1* | 1/2014 | Li | H04W 52/0206 455/561 |
| 2014/0295840 A1* | 10/2014 | Keskitalo | H04W 36/0061 455/436 |

OTHER PUBLICATIONS

TS36 (3rd Generation Partnership Project; Technical Specification Group Radio Access Network; TS 36.300 V11.3.0, Sep. 2012).*

* cited by examiner

*Primary Examiner* — Michael Thier
*Assistant Examiner* — Zhensheng Zhang
(74) *Attorney, Agent, or Firm* — Lee Hong Degerman Kang & Waimey

(57) ABSTRACT

A method and apparatus for switching a connection in a wireless communication system is provided. A source cell decides radio resource control (RRC) connection switching to a target cell, transmits an aggregated user equipment (UE) context transfer message to the target cell, and transmits an RRC connection switching message to a UE in coverage of the source cell. The RRC connection switching message includes information on an identity of the target cell and a period during which the UE should finish the RRC connection switching to the target cell.

10 Claims, 10 Drawing Sheets

METHOD AND APPARATUS FOR SWITCHING CONNECTION IN WIRELESS COMMUNICATION SYSTEM

CROSS-REFERENCE TO RELATED APPLICATIONS

Pursuant to 35 U.S.C. § 119(e), this application claims the benefit of U.S. Provisional Patent Application Ser. Nos. 61/752,982 filed on Jan. 16, 2013, and 61/753,951 filed on Jan. 18, 2013, the contents of which are all hereby incorporated by reference herein in their entirety.

BACKGROUND OF THE INVENTION

Field of the Invention

The present invention relates to wireless communications, and more specifically, to a method and apparatus for switching a connection in a wireless communication system.

Related Art

Universal mobile telecommunications system (UMTS) is a $3^{rd}$ generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the $3^{rd}$ generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Small cells using low power nodes are considered promising to cope with mobile traffic explosion, especially for hotspot deployments in indoor and outdoor scenarios. A low-power node generally means a node whose transmission (Tx) power is lower than macro node and base station (BS) classes, for example a pico and femto eNodeB (eNB) are both applicable. Small cell enhancements for 3GPP LTE will focus on additional functionalities for enhanced performance in hotspot areas for indoor and outdoor using low power nodes.

Currently, it is expected that the trend of mobile wireless networks will be toward the denser deployment of small cells for capacity enhancement. By increasing the number of small cells, end-users can be physically located closer to the network and therefore, the data capacity would be significantly improved. However, when considering the deployment of large number of small cells, some technical issues made from the differences between small cell deployment and macro cell deployment should be carefully identified and solved. As an example, though the turn on/off of macro cells is an important characteristic for macro cell deployment in terms of energy saving, such an aspect should also be further emphasized for small cell deployment. The reason is that the dynamic turn on/off of large number of small cells might have some RAN impacts.

A fast radio resource control (RRC) connection switching method in small cells with dynamic turn on/off may be required.

SUMMARY OF THE INVENTION

The present invention provides a method and apparatus for switching a connection in a wireless communication system. The present invention provides a method for switching a radio resource control (RRC) connection between small cells when dynamic turn on/off of small cells is applied. The present invention provides a method for transmitting aggregated user equipment (UE) context which may be implicit RRC connection switching request to a target cell.

In an aspect, a method for switching, by a source cell, a connection in a wireless communication system is provided. The method includes deciding radio resource control (RRC) connection switching to a target cell, transmitting an aggregated user equipment (UE) context transfer message to the target cell, and transmitting an RRC connection switching message to a UE in coverage of the source cell. The RRC connection switching message includes information on an identity of the target cell and a period during which the UE should finish the RRC connection switching to the target cell.

The RRC connection switching may be decided when the source cell is going to be turned off.

The RRC connection switching may be decided when the source cell is going to shrink coverage.

The aggregated UE context transfer message may be transmitted after the source cell knows that the target cell finishes expanding coverage and before the source cell starts turning off power.

The aggregated UE context transfer message may be transmitted after the source cell knows that the target cell finishes turning on power and before the source cell start shrinking coverage.

The method may further include receiving an aggregated UE context transfer acknowledge message which indicates successful reception of the aggregated UE context transfer message from the target cell.

The RRC connection switching message may be transmitted via a broadcasting message or an RRC message.

The method may further include transmitting an aggregated sequence number (SN) status transfer message to the target cell.

The method may further include receiving a UE context release message from the target cell, and releasing resource for the UE.

In another aspect, a method for switching, by a user equipment (UE), a connection in a wireless communication system is provided. The method includes receiving a radio resource control (RRC) connection switching message from a source cell which serves the UE. The RRC connection switching message includes information on an identity of a target cell and a period during which the UE should finish RRC connection switching to the target cell. The method further includes performing synchronization to the target cell, receiving an RRC connection switching complete message from the target cell, and resuming communication with a network.

The RRC connection switching message may be received via a broadcasting message or an RRC message.

The method may further include transmitting an RRC connection reconfiguration message to the target cell.

In another aspect, an eNodeB (eNB) controlling a source cell in a wireless communication system is provided. The eNB includes a radio frequency (RF) unit for transmitting or receiving a radio signal, and a processor coupled to the RF unit, and configured to decide radio resource control (RRC) connection switching to a target cell, transmit an aggregated user equipment (UE) context transfer message to the target cell, and transmit an RRC connection switching message to a UE in coverage of the source cell. The RRC connection switching message includes information on an identity of the target cell and a period during which the UE should finish the RRC connection switching to the target cell.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
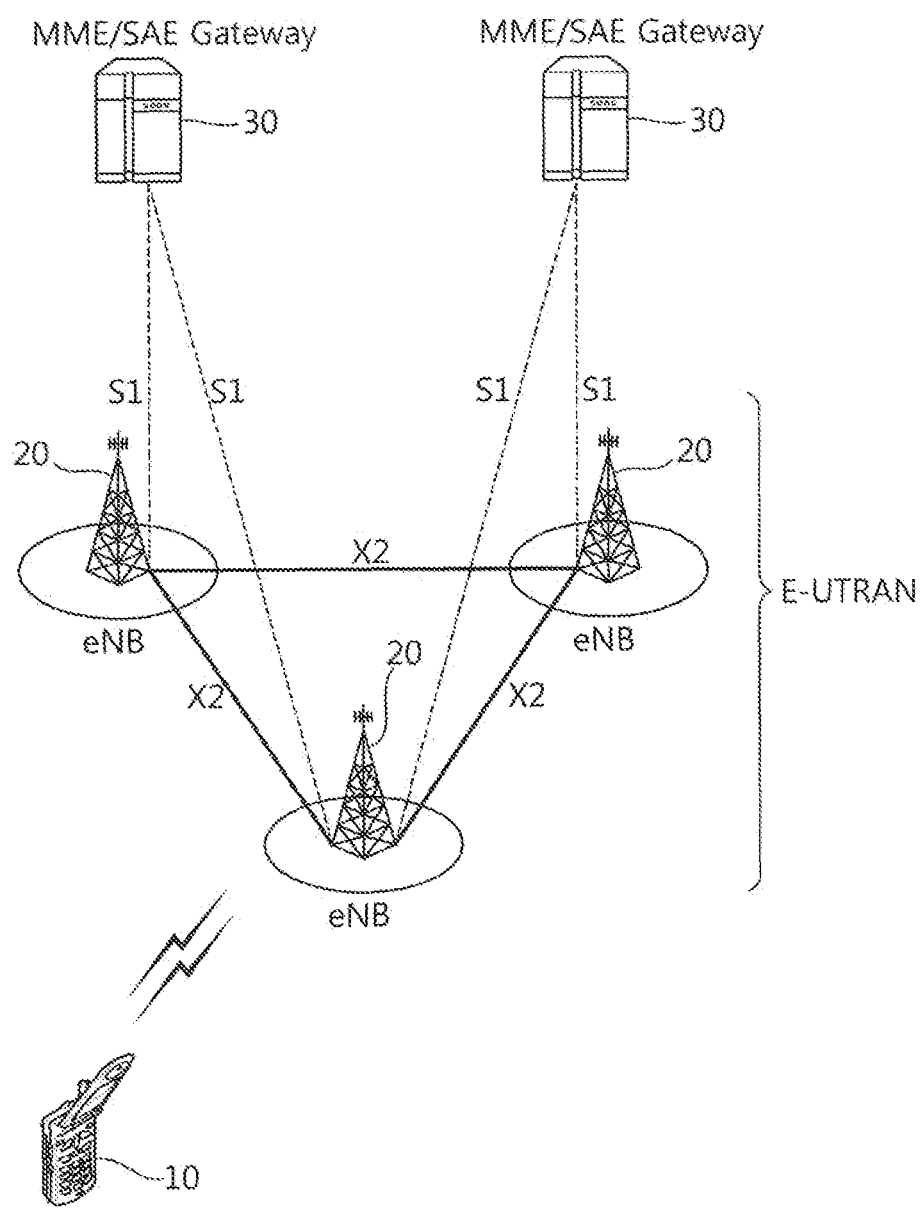
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
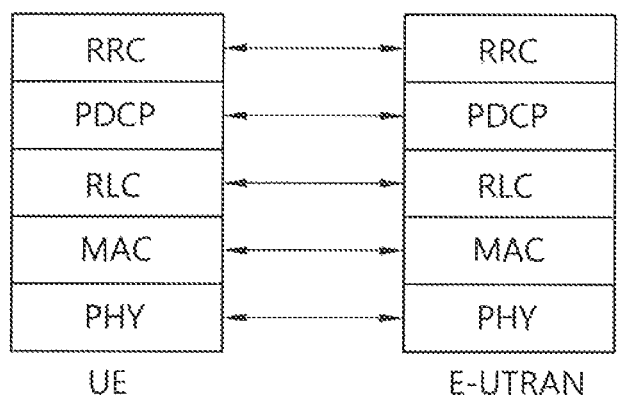
FIG. 2 shows a control plane of a radio interface protocol of an LTE system.
Figure 3:
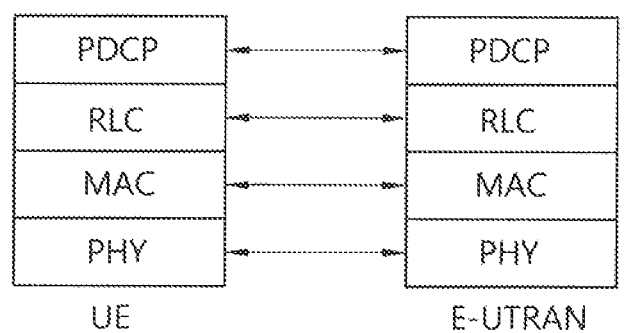
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
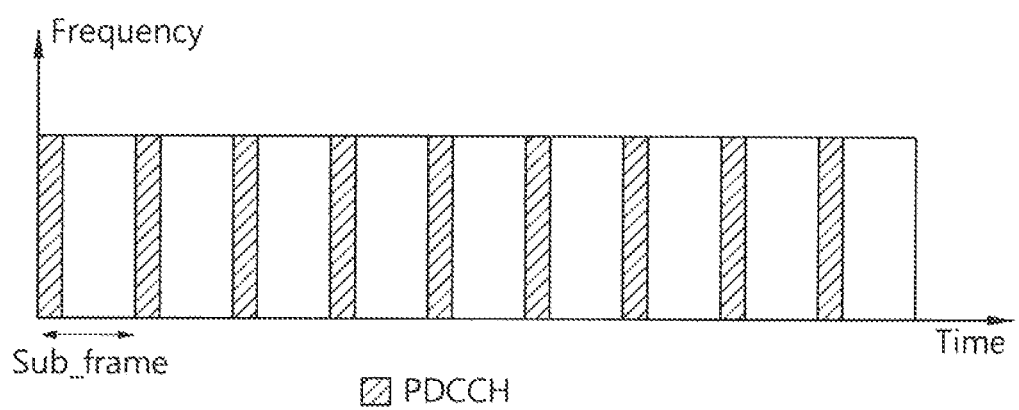
FIG. 4 shows an example of a physical channel structure.

FIG. 4 shows an example of a physical channel structure.

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

A cell is combination of DL resources and optionally UL resources. The linking between the carrier frequency of the DL resources and the carrier frequency of the UL resources is indicated in the system information on the DL resources.

Small cell enhancement is described. It may be referred to 3GPP TR 36.932 V12.0.0 (2012-12).

Figure 5:
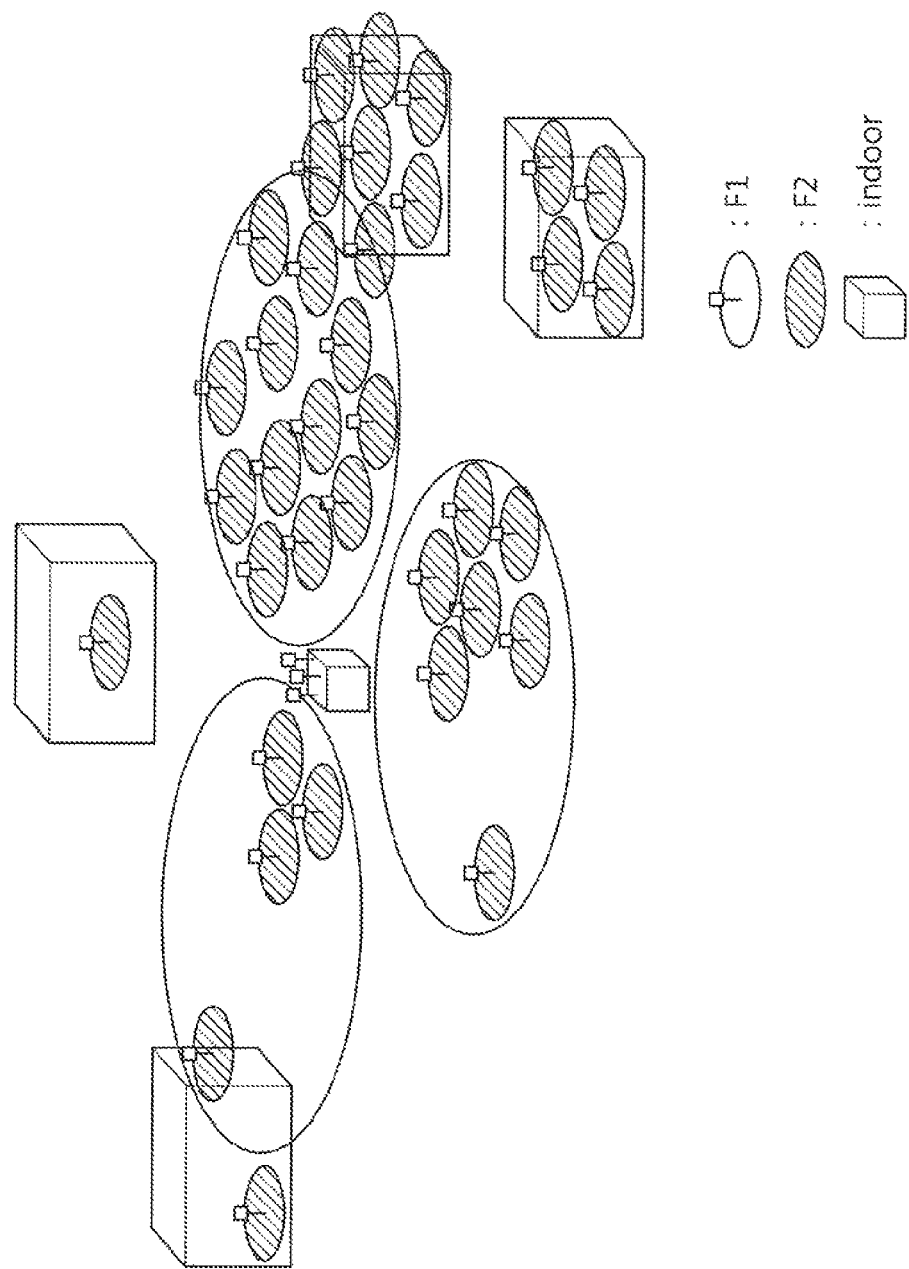
FIG. 5 shows deployment scenarios of small cells with/without macro coverage.

FIG. 5 shows deployment scenarios of small cells with/without macro coverage. Small cell enhancement should target both with and without macro coverage, both outdoor and indoor small cell deployments and both ideal and non-ideal backhaul. Both sparse and dense small cell deployments should be considered.

Referring to FIG. 5, small cell enhancement should target the deployment scenario in which small cell nodes are deployed under the coverage of one or more than one overlaid E-UTRAN macro-cell layer(s) in order to boost the capacity of already deployed cellular network. Two scenarios can be considered:

where the UE is in coverage of both the macro cell and the small cell simultaneously where the UE is not in coverage of both the macro cell and the small cell simultaneously.

Also, the deployment scenario where small cell nodes are not deployed under the coverage of one or more overlaid E-UTRAN macro-cell layer(s) may be considered.

Small cell enhancement should target both outdoor and indoor small cell deployments. The small cell nodes could be deployed indoors or outdoors, and in either case could provide service to indoor or outdoor UEs.

Both ideal backhaul (i.e., very high throughput and very low latency backhaul such as dedicated point-to-point connection using optical fiber, line-of-sight (LOS) microwave) and non-ideal backhaul (i.e., typical backhaul widely used in the market such as xDSL, non-LOS (NLOS) microwave, and other backhauls like relaying) should be studied. The performance-cost trade-off should be taken into account.

For interfaces between macro and small cell, as well as between small cells, the studies should first identify which kind of information is needed or beneficial to be exchanged between nodes in order to get the desired improvements before the actual type of interface is determined. And if direct interface should be assumed between macro and small cell, as well as between small cell and small cell, X2 interface can be used as a starting point.

Small cell enhancement should consider sparse and dense small cell deployments. In some scenarios (e.g., hotspot indoor/outdoor places, etc), single or a few small cell node(s) are sparsely deployed, e.g., to cover the hotspot(s). Meanwhile, in some scenarios (e.g., dense urban, large shopping mall, etc), a lot of small cell nodes are densely deployed to support huge traffic over a relatively wide area covered by the small cell nodes. The coverage of the small cell layer is generally discontinuous between different hotspot areas. Each hotspot area can be covered by a group of small cells, i.e., a small cell cluster.

Furthermore, smooth future extension/scalability (e.g., from sparse to dense, from small-area dense to large-area dense, or from normal-dense to super-dense) should be considered. For mobility/connectivity performance, both sparse and dense deployments should be considered with equal priority.

Both synchronized and un-synchronized scenarios should be considered between small cells as well as between small cells and macro cell(s). For specific operations, e.g., interference coordination, carrier aggregation and inter-eNB coordinated multi-point (COMP), small cell enhancement can benefit from synchronized deployments with respect to small cell search/measurements and interference/resource management. Therefore time synchronized deployments of small cell clusters are prioritized in the study and new means to achieve such synchronization shall be considered.

Small cell enhancement should address the deployment scenario in which different frequency bands are separately assigned to macro layer and small cell layer, respectively, where F1 and F2 in FIG. 5 correspond to different carriers in different frequency bands.

Small cell enhancement should be applicable to all existing and as well as future cellular bands, with special focus on higher frequency bands, e.g., the 3.5 GHz band, to enjoy the more available spectrum and wider bandwidth.

Small cell enhancement should also take into account the possibility for frequency bands that, at least locally, are only used for small cell deployments.

Co-channel deployment scenarios between macro layer and small cell layer should be considered as well.

Some example spectrum configurations are:

Carrier aggregation on the macro layer with bands X and Y, and only band X on the small cell layer Small cells supporting carrier aggregation bands that are co-channel with the macro layer Small cells supporting carrier aggregation bands that are not co-channel with the macro layer One potential co-channel deployment scenario is dense outdoor co-channel small cells deployment, considering low mobility UEs and non ideal backhaul. All small cells are under the Macro coverage.

Small cell enhancement should be supported irrespective of duplex schemes (FDD/TDD) for the frequency bands for macro layer and small cell layer. Air interface and solutions for small cell enhancement should be band-independent, and aggregated bandwidth per small cell should be no more than 100 MHz.

In a small cell deployment, it is likely that the traffic is fluctuating greatly since the number of users per small cell node is typically not so large due to small coverage.

In a small cell deployment, it is likely that the user distribution is very fluctuating between the small cell nodes. It is also expected that the traffic could be highly asymmetrical, either downlink or uplink centric.

Both uniform and non-uniform traffic load distribution in time-domain and spatial-domain should be considered. Non-full buffer and full buffer traffic are both included, and non-full buffer traffic is prioritized to verify the practical cases.

Backward compatibility, i.e., the possibility for legacy (pre-Release 12) UEs to access a small-cell node/carrier, is desirable for small cell deployments.

The introduction of non-backwards compatible features should be justified by sufficient gains.

Handover (HO) is described. It may be referred to Section 10.1.2.1 of 3GPP TS 36.300 V11.4.0 (2012-12). A network controls UE mobility in RRC_CONNECTED and for the network controlled mobility in RRC_CONNECTED, handover is the only procedure that is currently defined. Generally, the network triggers the handover procedure based on radio conditions, load.

Figure 6:
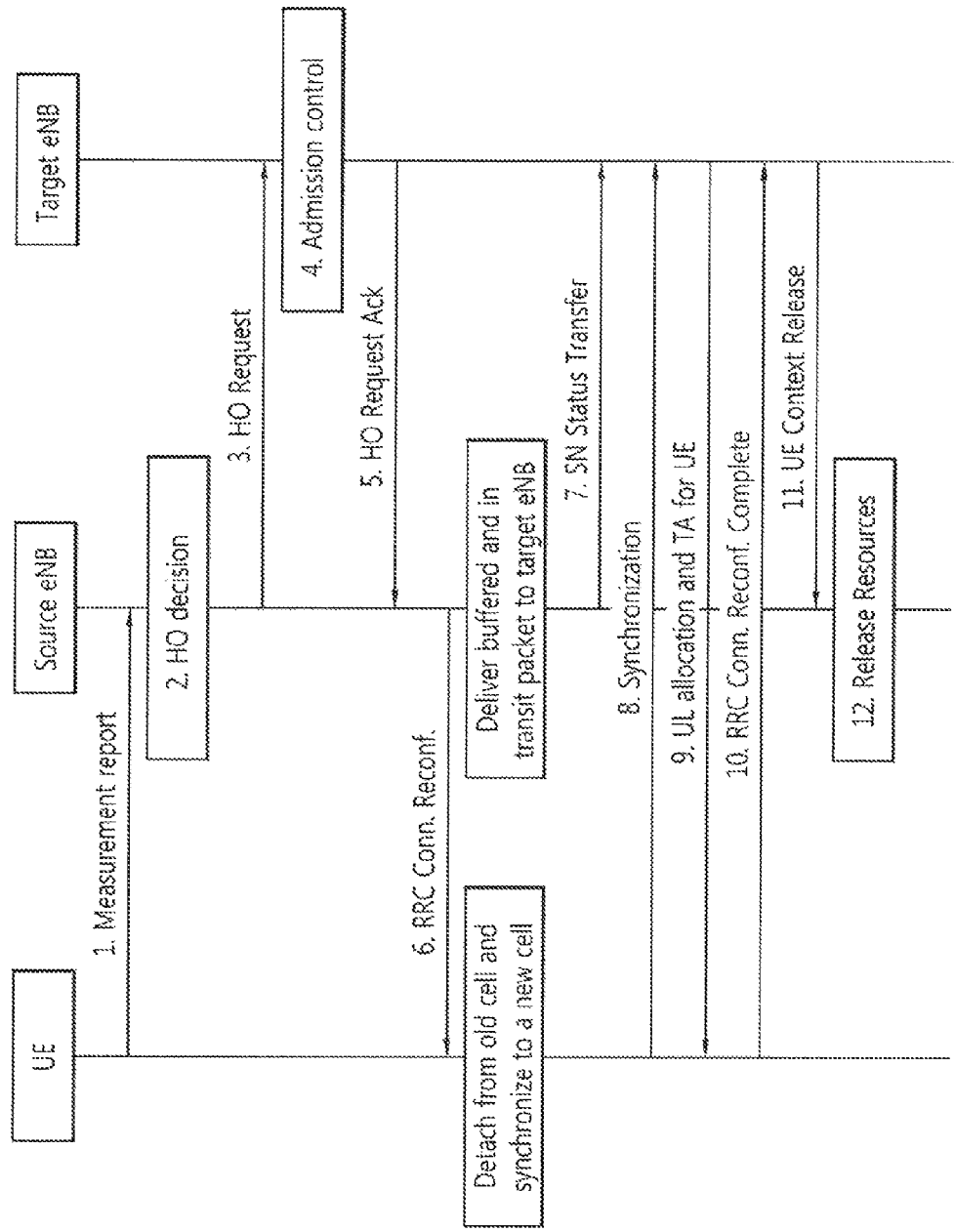
FIG. 6 shows an example of a handover procedure.

FIG. 6 shows an example of a handover procedure.

1. The UE is triggered to send measurement reports by the rules set by i.e., system information, specification, etc.

2. The source eNB makes decision based on measurement reports and radio resource management (RRM) information to hand off the UE.

3. The source eNB issues a handover request message to the target eNB passing necessary information to prepare the HO at the target side (UE X2 signaling context reference at source eNB, UE S1 EPC signaling context reference, target cell identifier (ID), $K_{eNB}^*$, RRC context including the cell radio network temporary identifier (C-RNTI) of the UE in the source eNB, AS-configuration, E-UTRAN radio access bearer (E-RAB) context and physical layer identifier (ID) of the source cell+short MAC-I for possible radio link failure (RLF) recovery). UE X2/UE S1 signaling references enable the target eNB to address the source eNB and the EPC. The E-RAB context includes necessary radio network layer (RNL) and transport network layer (TNL) addressing information, and quality of service (QoS) profiles of the E-RABs.

4. Admission control may be performed by the target eNB dependent on the received E-RAB QoS information to increase the likelihood of a successful HO, if the resources can be granted by target eNB. The target eNB configures the required resources according to the received E-RAB QoS information and reserves a C-RNTI and optionally a RACH preamble. The AS-configuration to be used in the target cell can either be specified independently (i.e., an "establishment") or as a delta compared to the AS-configuration used in the source cell (i.e., a "reconfiguration").

5. The target eNB prepares HO with L1/L2 and sends the handover request acknowledge to the source eNB. The handover request acknowledge message includes a transparent container to be sent to the UE as an RRC message to perform the handover. The container includes a new C-RNTI, target eNB security algorithm identifiers for the selected security algorithms, may include a dedicated RACH preamble, and possibly some other parameters, i.e., access parameters, SIBs, etc. The handover request acknowledge message may also include RNL/TNL information for the forwarding tunnels, if necessary.

As soon as the source eNB receives the handover request acknowledge, or as soon as the transmission of the handover command is initiated in the downlink, data forwarding may be initiated.

Steps described below provide means to avoid data loss during HO.

6. The target eNB generates the RRC message to perform the handover, i.e., RRCConnectionReconfiguration message including the mobilityControlInformation, to be sent by the source eNB towards the UE. The source eNB performs the necessary integrity protection and ciphering of the message. The UE receives the RRCConnectionReconfiguration message with necessary parameters (i.e. new C-RNTI, target eNB security algorithm identifiers, and optionally dedicated RACH preamble, target eNB SIBs, etc.) and is commanded by the source eNB to perform the HO. The UE does not need to delay the handover execution for delivering the HARQ/ARQ responses to source eNB.

7. The source eNB sends the sequence number (SN) status transfer message to the target eNB to convey the uplink PDCP SN receiver status and the downlink PDCP SN transmitter status of E-RABs for which PDCP status preservation applies (i.e., for RLC AM). The uplink PDCP SN receiver status includes at least the PDCP SN of the first missing UL service data unit (SDU) and may include a bit map of the receive status of the out of sequence UL SDUs that the UE needs to retransmit in the target cell, if there are any such SDUs. The downlink PDCP SN transmitter status indicates the next PDCP SN that the target eNB shall assign to new SDUs, not having a PDCP SN yet. The source eNB may omit sending this message if none of the E-RABs of the UE shall be treated with PDCP status preservation.

8. After receiving the RRCConnectionReconfiguration message including the mobilityControlInformation, UE performs synchronization to target eNB and accesses the target cell via RACH, following a contention-free procedure if a dedicated RACH preamble was indicated in the mobilityControlInformation, or following a contention-based procedure if no dedicated preamble was indicated. UE derives target eNB specific keys and configures the selected security algorithms to be used in the target cell.

9. The target eNB responds with UL allocation and timing advance.

10. When the UE has successfully accessed the target cell, the UE sends the RRCConnectionReconfigurationComplete message (C-RNTI) to confirm the handover, along with an uplink buffer status report, whenever possible, to the target eNB to indicate that the handover procedure is completed for the UE. The target eNB verifies the C-RNTI sent in the RRCConnectionReconfigurationComplete message. The target eNB can now begin sending data to the UE.

11. By sending the UE context release message, the target eNB informs success of HO to source eNB and triggers the release of resources by the source eNB. The target eNB sends this message after the path switch request acknowledge message is received from the MME.

12. Upon reception of the UE context release message, the source eNB can release radio and C-plane related resources associated to the UE context. Any ongoing data forwarding may continue.

Dynamic turn on/off of small cells is described. The network may control expansion/shrinkage of a small cell based on information transmitted from a neighbor small cells that are going to be turned on or turned off. Such information may contain period of turning on/off, timing of turning on/off, etc.

Figure 7:
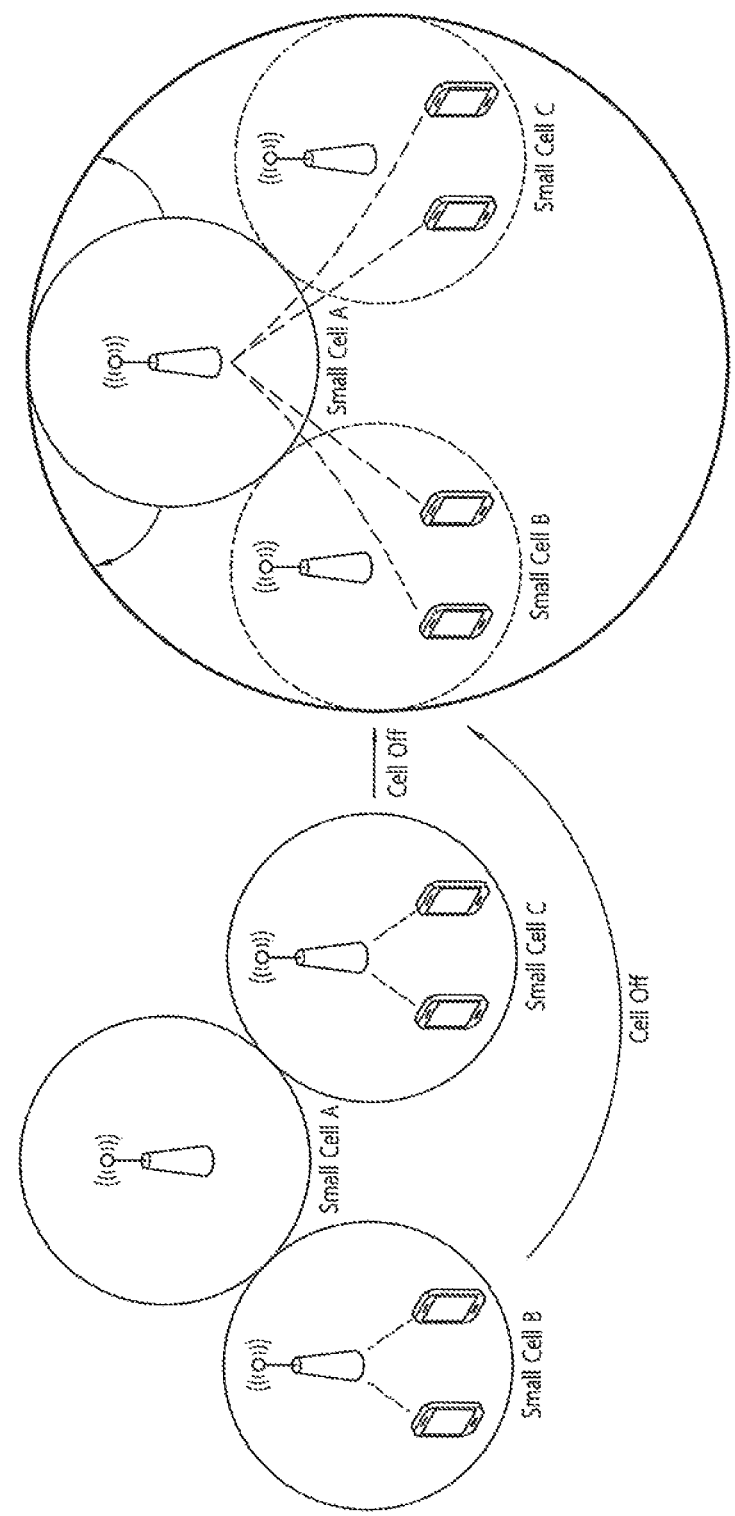
FIG. 7 shows an example of a deployment scenario of standalone small cells with dynamic turn on/off states.

FIG. 7 shows an example of a deployment scenario of standalone small cells with dynamic turn on/off states.

Referring to FIG. 7, there are 3 small cells, i.e., small cell A, small cell B, and small cell C. It is assumed that that the small cell B and small cell C are going to be turned off. In such case, the small cell A should expand its coverage to accommodate UEs served by the small cell B and small cell C. On the contrary, if the small cell B and small cell C are going to be turned on again, the small cell A, whose coverage is expanded, should shrink its own coverage to leave the UEs back to the original small cell B and small cell C.

For dynamic turn on/off of small cells, the small cell that is going to be turned off should notify its state change in the near future to the small cell that should expand its coverage and accommodate UEs on behalf of the small cell that will be turned off soon. Conversely, the small cell that is going to be turned on again should notify its state changes in the near future to the small cell that should shrink its coverage and leave the UEs back to the small cell that will be turned on again. Hereinafter, for convenience, the small cell that is going to be turned off or going to be turned on is called a first type cell or on-and-off cell. And, the small cell that should expand or shrink its coverage is called a second type cell or shrink-and-expand cell.

The first type cell and second type cell needs to be distinguished. For example, the first type cell and second type cell may be distinguished by using the currently defined X2 procedure, e.g., X2 setup procedure. More specifically, the type of a cell, i.e., on-and-off or shrink-and-expand, may be added to X2 setup messages as an information element (IE) of served cell Information. Accordingly, the network may know which cell can act as the first type cell and may also know which cell can act as the second cell. The type of cell may be informed to the neighbor cells by other X2 procedure such as the eNB configuration update procedure, etc.

Figure 8:
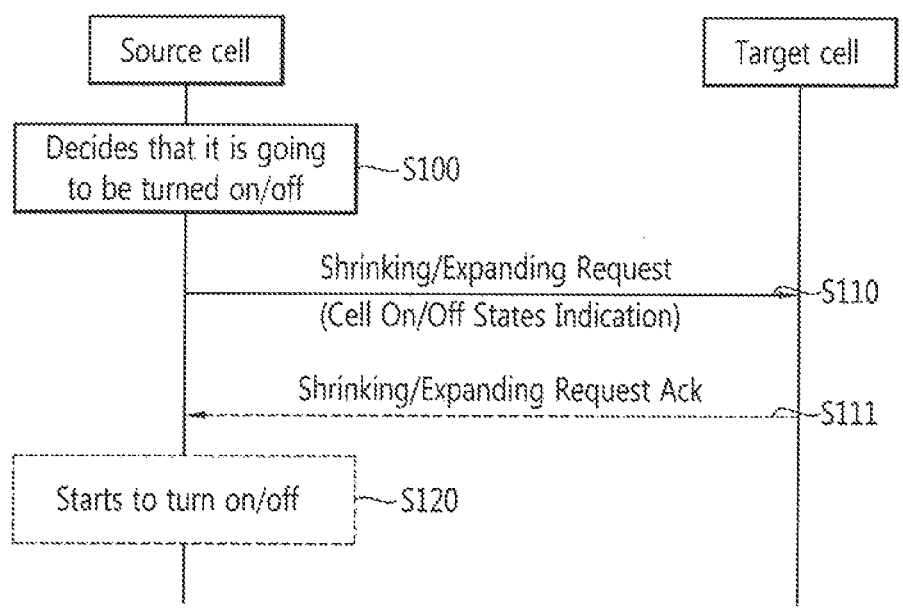
FIG. 8 shows an example of a dynamic cell turn on/off procedure.

FIG. 8 shows an example of a dynamic cell turn on/off procedure.

In step S100, a source cell, which is the first type cell or on-and-off cell described above, decides that it is going to be turned off soon, or decides that it will be turned on soon again.

If the source cell decides that it is going to be turned off soon, in step S110, the source cell transmits an expanding request to a target cell that has a role to expand its coverage, i.e., the second type cell or shrink-and-expand cell described above, for UEs served by the source cell that will be turned off soon. The expanding request may include cell off indication of the source cell.

Conversely, if the source cell decides that it will be turned on soon again, in step S110, the source cell transmits a shrinking request to the target cell that have a role to shrink its coverage, i.e., the second type cell or shrink-and-expand cell described above, for leaving the UEs back to the source cell that will be turned on soon. The shrinking request may include cell on indication of the source cell.

In step S111, the target cell may transmit subsequently an expanding request acknowledge or shrinking request acknowledge to the source cell. The expanding request acknowledge may indicate successful reception of the expanding request. The shrinking request acknowledge may indicate successful reception of the shrinking request.

In step S120, the source cell turns on or turn off according to its decision.

All information exchange described above may be done either through X2 interface (wired) or air interface (wireless) between cells.

When considering the deployment of small cells with dynamic turn on/off states, current handover procedure needs to be optimized in terms of the signaling overhead and latency. This is due to the intrinsic feature of small cells. Specifically, the coverage of small cell is not so large and this inevitably results in the frequent cell changes, e.g., handover between hyper-dense small cells.

Hereinafter, a method for switching RRC connection between small cells with dynamic turn on/off states according to an embodiment of the present invention is described. According to an embodiment of the present invention, a network controls mobility of a UE in RRC_CONNECTED based on information such as a state change of neighbor small cell on/off. Such information may also contain period during which an RRC connection should be switched to a target cell. For example, the target cell may be a cell that will expand its coverage, i.e., the second type cell or shrink-and-expand cell described in FIG. 7, and thus can give service to UEs on behalf of the source cell. In such case, the source cell may be a cell that will turn its power off soon, i.e., the first type cell or on-and-off cell described in FIG. 7, and cannot give service to the UEs anymore. Alternatively, the source cell may be a cell that will shrink its coverage, i.e., the second type cell or shrink-and-expand cell described in FIG. 7, and thus cannot accommodate UEs and the in this case, the target small cell may be a cell that will turn its power on soon, i.e., the first type cell or on-and-off cell described in FIG. 7, and can provide service to the UEs on behalf of the source cell.

According to an embodiment of the present invention, a source small cell that will be turned off soon should notify UEs in its coverage about the state change and also the information needed for RRC connection switching. Such information may contain an identity of a target small cell that will extend its own coverage to accommodate the UEs on behalf of the corresponding source small cell that will be turned off soon. Also, such information may contain the period during which the UEs should finish the RRC connection switching to the target small cells. Clearly, this should be done after the source small cells decides the target small cell and makes a decision on RRC connection switching.

If the source small cell is going to be turned off soon, for all UEs in RRC_CONNECTED, the source small cell transmits to the target small cell aggregated UE context information such as E-RAB QoS information, AS configuration information, etc. The transmission of such information should be done after the target small cell completes expanding its own coverage and before the source small cell starts turning its power off. On the other hand, if the source small cell is going to shrink its coverage soon, the transmission of such information should be done before the source small cell starts shrinking its coverage and after the target small cell finishes turning its power on. The transmission of the aggregated UE context information may be interpreted by the target small cell as an implicit RRC connection switching request. After the source small cell informs all the UEs in RRC_CONNECTED about its state change and the target small cell related information, the source small cell forwards aggregated SN status of corresponding UEs to the target small cell. When the UEs receive the information required for RRC connection switching via broadcasting from the source small cell, the UES start synchronization to the target small cell. After completing RRC connection switching to the target small cell, the UEs may resume communication. Finally, the target small cell transmits a UE context release to the source small cell for the source small cell to release the corresponding UE contexts. Also, the target small cell should inform its original UEs about the change of its power level.

Figure 9:
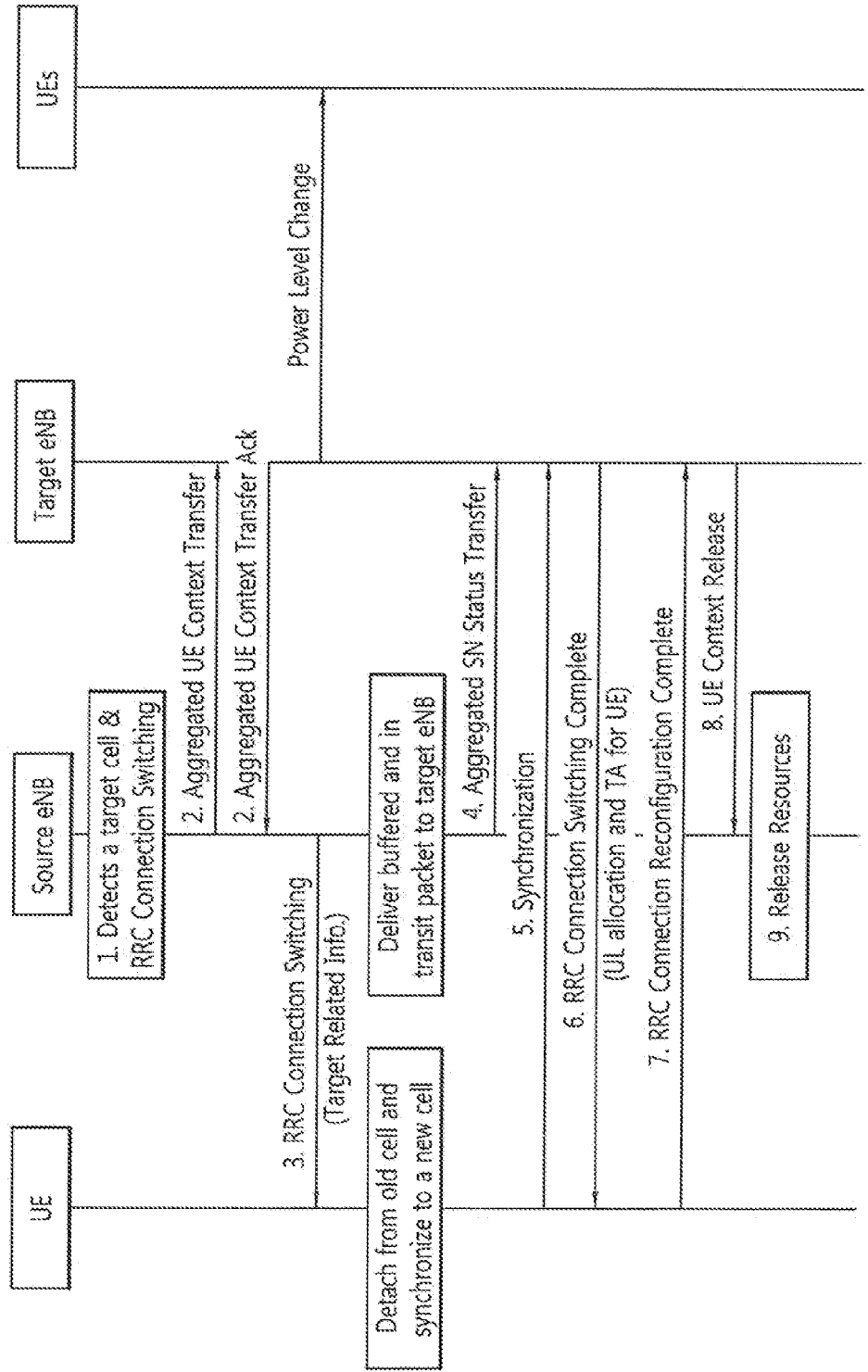
FIG. 9 shows an example of a procedure for switching RRC connection between small cells according to an embodiment of the present invention.

FIG. 9 shows an example of a procedure for switching RRC connection between small cells according to an embodiment of the present invention.

1. The source small cell decides that it will be turned off soon. Alternatively, the source small cell decides that it will shrink its coverage soon. The source small cell detects a target small cell, and initiates RRC connection switching. At this time, the source small cell can initiates RRC connection switching without measurement reports transmitted from UEs, which is different from the current handover procedure.

2. Upon initiating RRC connection switching, the source small cell transmit an aggregated UE context transfer message to the target small cell. The aggregated UE context transfer message may be interpreted by the target small cell as an implicit RRC connection switching request for the corresponding UEs. If the source small cell is going to turn its power off soon, the aggregated UE context transfer message should be transmitted after the source small cell knows that the target small cell finishes expanding its coverage and before the source small cell starts turning its power off. Alternatively, the source small cell is going to shrink its coverage soon, the aggregated UE context transfer message should be transmitted after the source small cell knows that the target small cell finishes turning its power on and before the source small cell start shrinking its coverage. The target small cell may transmit an aggregated UE context transfer acknowledge message to indicate to the source small cell about the successful reception of the aggregated UE context transfer message related to the RRC connection switching to itself.

3. The source small cell transmits an RRC connection switching message to the UEs in RRC_CONNECTED under its coverage. The source small cell notifies the UEs in RRC_CONNECTED under its coverage about the information on the target small cell and the period during which the UE should finish the RRC connection switching to the target small cell. The information on the target small cell may contain any data that can be used to identify the target small cell. In addition, the information on the target small cell may be transmitted from the source small cell to the UEs via a broadcasting message, e.g., common control signaling (system information (SI)). Besides, the information on the target small cell may be transmitted from the source small cell to the UE through via an RRC message. This can be interpreted by the UE as the RRC connection switching request to the specified target small cell.

In FIG. 9, it is assumed that transmission of the information on the target small cell to the UEs in RRC_CONNECTED is performed after the aggregated UE context transfer message is transmitted to the target small cell. However, the present invention is not limited thereto, and accordingly, the after the source small cells notifies the UEs in RRC_CONNECTED about the information identifying the target small cell first, the source small cell may transmit the aggregated UE context transfer message to the target small cell.

4. The source small cell transmits an aggregated SN status transfer message to the target small cell.

5. When the UE obtains the information regarding the identity of the target small cell and the period during which the UE should finish the RRC connection switching to the target small cell, the corresponding UE performs synchronization to the target small cell.

6. The target small cell transmits an RRC connection switching complete message to the UEs. In addition, the target small cell transmits UL allocation and timing advance for the UEs.

7. The UEs transmit an RRC connection reconfiguration message to the target small cell.

8. The target small cell transmits a UE context release message to the source small cell.

9. The source small cell release resources for the corresponding UEs.

When the RRC connection switching is successfully finished to the target small cell, the UE resumes communication with the network. Also, the target small cell may inform its original UEs about the change of its power level.

Figure 10:
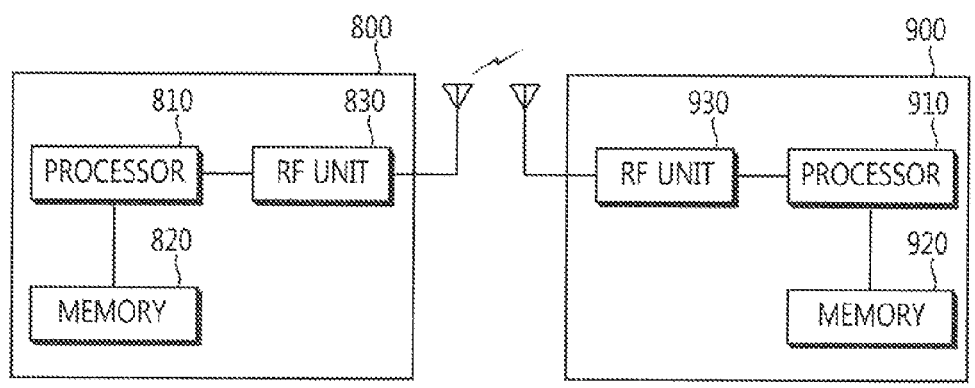
FIG. 10 shows a wireless communication system to implement an embodiment of the present invention.

FIG. 10 shows a wireless communication system to implement an embodiment of the present invention.

A first eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A second eNB or UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

According to the present invention, overhead of the RRC connection switching procedure to the network can be lessen compared to the current handover procedure.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for switching, by a source cell, a connection in a wireless communication system, the method comprising:

receiving a first indication indicating that a target cell finishes expanding coverage or turning on power, from the target cell;

if the source cell receives the first indication, deciding radio resource control (RRC) connection switching to the target cell when the source cell is going to turn power off or shrink coverage, wherein the RRC connection switching is decided without a measurement report transmitted from a user equipment (UE);

if the source cell decides the RRC connection switching to the target cell, transmitting an aggregated UE context transfer message to the target cell and transmitting an RRC connection switching message to all UEs in coverage of the source cell, wherein the aggregated UE context transfer message and the RRC connection switching message are transmitted after the source cell knows that the target cell finishes expanding coverage or turning on power before the source cell starts turning power off or shrinking coverage; and turning power off or shrinking coverage when the RRC connection switching to the target cell is finished, wherein the RRC connection switching message includes information on an identity of the target cell, a second indication to inform the all UEs that the source cell is going to turn power off or shrink coverage and a period during which the UE should finish the RRC connection switching to the target cell, wherein the period is determined by the source cell, and wherein coverage of the source cell is included in coverage of the target cell which finishes expanding coverage or turning on power.

2. The method of claim 1, further comprising:
receiving an aggregated UE context transfer acknowledge message which indicates successful reception of the aggregated UE context transfer message from the target cell.

3. The method of claim 1, wherein the RRC connection switching message is transmitted via a broadcasting message or an RRC message.

4. The method of claim 1, further comprising:
transmitting an aggregated sequence number (SN) status transfer message to the target cell.

5. The method of claim 1, further comprising:
receiving a UE context release message from the target cell; and
releasing resource for the UE.

6. A method for switching, by a user equipment (UE), a connection in a wireless communication system, the method comprising:
if radio resource control (RRC) connection switching to a target cell is decided by a source cell without a measurement report transmitted from the UE, receiving a RCC connection switching message from the source cell which serves the UE after the source cell knows that the target cell finishes expanding coverage or turning on power before the source cell starts turning power off or shrinking coverage, wherein the RRC connection switching message includes information on an identity of the target cell, a second indication to inform all UEs that the source cell is going to turn power off or shrink coverage and a period during which the UE should finish RRC connection switching to the target cell,
performing synchronization to the target cell before the source cell starts turning power off or shrinking coverage;
receiving an RRC connection switching complete message from the target cell before the source cell starts turning power off or shrinking coverage; and
resuming communication with a network when the RRC connection switching to the target cell is finished, wherein the period is determined by the source cell, wherein coverage of the source cell is included in coverage of the target cell which finishes expanding coverage or turning on power, wherein the source cell decides the RRC connection switching to the target cell when the source cell is going to turn power off or shrink coverage and receives a first indication from the target cell, and wherein the first indication indicates that the target cell finishes expanding coverage or turning on power.

7. The method of claim 6, wherein the RRC connection switching message is received via a broadcasting message or an RRC message.

8. The method of claim 6, further comprising:
transmitting an RRC connection reconfiguration message to the target cell.

9. An eNodeB (eNB) controlling a source cell in a wireless communication system, the eNB comprising:
a radio frequency (RF) unit for transmitting or receiving a radio signal; and
a processor coupled to the RF unit, and configured to:
receive a first indication indicating that a target cell finishes expanding coverage or turning on power, from the target cell;
if the source cell receives the first indication, decide radio resource control (RRC) connection switching to the target cell when the source cell is going to turn power off or shrink coverage, wherein the RRC connection switching is decided without a measurement report transmitted from a user equipment (UE);
if the source cell decides RRC connection switching to the target cell, transmit an aggregated UE context transfer message to the target cell and transmit an RRC connection switching message to all UEs in coverage of the source cell, wherein the aggregated UE context transfer message and the RRC connection switching message are transmitted after the source cell knows that the target cell finishes expanding coverage or turning on power before the source cell starts turning power off or shrinking coverage; and
turn power off or shrink coverage when the RRC connection switching to the target cell is finished, wherein the RRC connection switching message includes information on an identity of the target cell, a second indication to inform the all UEs that the source cell is going to turn power off or shrink coverage and a period during which the UE should finish the RRC connection switching to the target cell, wherein the period is determined by the source cell, and wherein coverage of the source cell is included in coverage of the target cell which finishes expanding coverage or turning on power.

10. The eNB of claim 9, wherein the RRC connection switching message is transmitted via a broadcasting message or an RRC message.

* * * * *